US009177174B1

(12) United States Patent
Shoemaker et al.

(10) Patent No.: US 9,177,174 B1
(45) Date of Patent: Nov. 3, 2015

(54) SYSTEMS AND METHODS FOR PROTECTING SENSITIVE DATA IN COMMUNICATIONS

(71) Applicant: GOOGLE INC., Mountain View, CA (US)

(72) Inventors: Garth Shoemaker, Sunnyvale, CA (US); Ivan Medvedev, Bellevue, WA (US)

(73) Assignee: GOOGLE INC., Mountain View, CA (US)

( * ) Notice: Subject to any disclaimer, the term of this patent is extended or adjusted under 35 U.S.C. 154(b) by 35 days.

(21) Appl. No.: 14/174,723

(22) Filed: Feb. 6, 2014

(51) Int. Cl.
*G06F 21/00* (2013.01)
*G06F 21/62* (2013.01)

(52) U.S. Cl.
CPC .................................. *G06F 21/6254* (2013.01)

(58) Field of Classification Search
CPC ........................... G06F 19/322; G06F 21/6254
USPC ....................................................... 726/1–30
See application file for complete search history.

(56) References Cited

U.S. PATENT DOCUMENTS

| 7,958,268 | B2  |   | 6/2011  | Redlich et al. |
|-----------|-----|---|---------|----------------|
| 8,275,850 | B2  | * | 9/2012  | Kohan et al. ................. 709/212 |
| 8,863,301 | B2  | * | 10/2014 | Agrawal et al. ................. 726/26 |
| 2005/0154746 | A1 | * | 7/2005  | Liu et al. ....................... 707/101 |
| 2006/0048224 | A1 |   | 3/2006  | Duncan et al. |
| 2006/0075228 | A1 | * | 4/2006  | Black et al. ................... 713/167 |
| 2007/0261099 | A1 | * | 11/2007 | Broussard et al. ............... 726/1 |
| 2009/0112867 | A1 | * | 4/2009  | Roy et al. .......................... 707/9 |
| 2009/0150362 | A1 | * | 6/2009  | Evenhaim ........................ 707/3 |
| 2009/0288141 | A1 | * | 11/2009 | Khachaturov .................... 726/3 |
| 2011/0004606 | A1 | * | 1/2011  | Aumann et al. ............. 707/759 |
| 2012/0210388 | A1 |   | 8/2012  | Kolishchak |

FOREIGN PATENT DOCUMENTS

WO        2007133504  A2    11/2007

* cited by examiner

*Primary Examiner* — Amir Mehrmanesh
(74) *Attorney, Agent, or Firm* — Procopio, Cory, Hargreaves & Savitch LLP (57) ABSTRACT

Systems and methods for protecting sensitive data in communications are described, including identifying first information in content created by a user for a communication; sending the first information to a vault; receiving, from the vault, an identifier associated with the first information; replacing the first information in the content with second information that is associated with the first information and does not provide any indication of the content of the first information; and sending the communication comprising the content with the second information and the identifier.

20 Claims, 10 Drawing Sheets

FIG. 1

| From: Alice | To: Bob |
|---|---|
| Subject: Order on November 28, 2013 | Send |

Hi Bob,

My credit card number for the order is 5432 1234 5678 9109. I hope the shipment is able to arrive on time. I really need these widgets for holiday gifts! Thanks for taking my order.

Alice

FIG. 2A

| From: Alice | To: Bob |
|---|---|
| Subject: Order on November 28, 2013 | Send |

Hi Bob,

My credit card number for the order is 5432 1234 5678 9109. I hope the shipment is able to arrive on time. I re... s for holiday gifts! Thanks for taking my order.

Alice

Replace With
Limit Access
Other
Secure the Data

A Placeholder
Blank Format
A Link
Other
User Defined

FIG. 2B

| From: Alice | To: Bob |
|---|---|
| Subject: Order on November 28, 2013 | Send |

Hi Bob,

My credit card number for the order is 5432 1234 5678 9109. I hope the shipment is able to arrive on time. I re... s for holiday gifts! Thanks for taking my order.

Alice

Use Placeholder
Limit Access
Other
Secure the Data

2 Weeks
1 Month
3 Months
6 Months
Enter Date

FIG. 2C

| From: Alice | To: Bob |
|---|---|
| Subject: Order on November 28, 2013 | [ Send ] |

Hi Bob,

My credit card number for the order is 5432 1234 5678 9109. I hope the shipment is able to arrive on time. I re​Use Placeholder​s for holiday gifts! Thanks for taking my order.
Limit to 3 months
Other

[ Secure the Data ]

Alice

FIG. 2D

| From: Alice | To: Bob |
|---|---|
| Subject: Order on November 28, 2013 | [ Send ] |

Hi Bob,

My credit card number for the order is XXXX-XXXX-XXXX-XXXX. I hope the shipment is able to arrive on time. I really need these widgets for holiday gifts! Thanks for taking my order.

Alice

FIG. 3A

| From: Alice | To: Bob |
|---|---|
| Subject: Order on November 28, 2013 | [ Send ] |

Hi Bob,

My credit card number for the order is 3F5904E0-EF89-51D3-2A0C-4303E82C3301. I hope the shipment is able to arrive on time. I really need these widgets for holiday gifts! Thanks for taking my order.

Alice

| From: Alice | To: Bob |
|---|---|
| Subject: Order on November 28, 2013 | Reply / Forward |
| Hi Bob, | |

Hi Bob,

My credit card number for the order is XXXX-XXXX-XXXX-XXXX. I hope the shipment is able to arrive on time. I really need these widgets for holiday gifts! Thanks for taking my order.

Alice

Stored Copy

FIG. 6A

| From: Alice | To: Bob |
|---|---|
| Subject: Order on November 28, 2013 | Reply / Forward |

Hi Bob,

My credit card number for the order is 5432 1234 5678 9109. I hope the shipment is able to arrive on time. I really need these widgets for holiday gifts! Thanks for taking my order.

Alice

Rendered Copy

FIG. 10

SYSTEMS AND METHODS FOR PROTECTING SENSITIVE DATA IN COMMUNICATIONS

BACKGROUND

1. Field

The subject matter discussed herein relates generally to electronic or digital communications and, more particularly, to systems and methods for protecting sensitive data in communications.

2. Related Background

Digital communications, such as emails, documents, text messages, images, sometimes contain sensitive data, such as credit card numbers, passwords, and identifiers, etc. Users may sometimes need to include sensitive data in communications (e.g., in an email or a document) but do not want the sensitive data to be accessed by another without permission (e.g., end up in the wrong hands).

Related art tools allow the communications to be encrypted in transit from point A to point B using Secure Sockets Layer (SSL), Transport Layer Security (TLS), or other cryptographic protocols. However, once the communications reach point B, the communications are decrypted to their original forms. Communications may then be received without permission (e.g., fall in the wrong hands) at point B. For example, a user may electronically forward a communication with the sensitive data intact to an unintended recipient or convert a communication in another medium (e.g., paper copy) that can be accessed by an unintended viewer.

SUMMARY

The subject matter includes methods for protecting sensitive data in communications, including identifying first information in content created by a user for a communication; sending the first information to a vault; receiving, from the vault, an identifier associated with the first information; replacing the first information in the content with second information that is associated with the first information and does not provide any indication of the content of the first information; and sending the communication comprising the content with the second information and the identifier.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for protecting sensitive data in communications.

Figure 1:
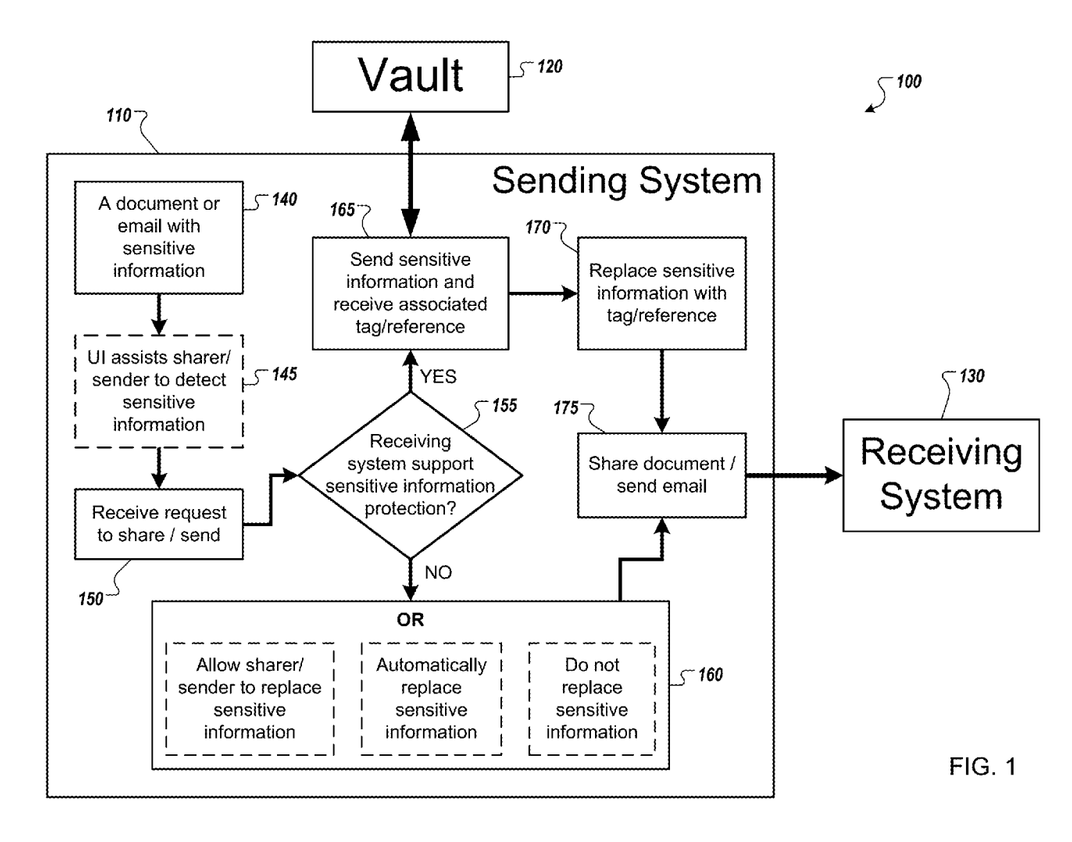
FIG. 1 shows an example communication environment according to some example implementations.

FIG. 1 shows an example communication environment according to some example implementations. Environment 100 includes, for example, sending system 110, vault 120, and receiving system 130. Each of the sending system 110, vault 120, and receiving system 130 may be implemented using one or more devices with one or more data stores. In some implementations, vault 120 may be implemented as part of sending system 110 or receiving system 130.

Each of sending system 110 and receiving system 130 can be implemented to provide the functions of both a sending system and a receiving system. The term "sending system" and "receiving system" are only labels that associated with the functions provided with respect to a communication. For example, when a communication (e.g., email) is sent from system A to system B, system A is considered the sending system 110 and system B is considered the receiving system 130 with respect to that email. If a communication such as a response (e.g., a reply email) is sent from system B to system A, system B is considered the sending system 110 and system A is considered the receiving system 130 with respect to the reply email.

Sending system 110 may communicate with other receiving systems (not shown) and store sensitive information in other vaults (not shown). Receiving system 130 may receive content, emails, documents, etc. from other sending systems (not shown).

In some implementations, the functions, operations, or process or sending system 110 may include identifying, at block 140, a digital communication or content (e.g., an email, document, text message, image, other digital content, etc.) to be provided by one user (e.g., user Alice) associated with sending system 110 to another user (e.g., user Bob) associated with receiving system 130. For example, Alice may have selected a document to share with Bob or written an email to send to Bob. The content identified at 140 may contain sensitive data or confidential data (collectively referred to as "sensitive information"). Sensitive information is any information that the sender or receiver (e.g., Alice or Bob) does not want to reveal to a third party (e.g., any user other than Alice, the sender, and Bob, the intended recipient). Examples of sensitive information include but are not limited to objectively sensitive information and subjectively sensitive information. Sensitive information may occur in one or more locations of a communication.

Objectively sensitive information is information that most users would characterize as being sensitive, such as credit card numbers, personal identifiers, personal financial information, account numbers, personal medical information, passwords, personal identification numbers or personal identification numbers (e.g., PINs), government issued identifiers (e.g., driver license numbers, social security numbers, etc.), employment information or identifiers. Subjectively sensitive information is information that a particular sender and/or receiver (e.g., Alice and/or Bob) may consider sensitive, but other users may not characterize as sensitive.

At block 145, a user interface (UI) may be provided to the sharer or sender (e.g., Alice) to identify or detect information at one or more location of the communication that Alice considers sensitive. Example of such UI are shown in FIGS. 2A-D and described below.

In some implementations, sensitive information may be automatically identified and/or detected by sending system 110 or a non-user (e.g., without the assistance or intervention of any users, such as Alice). For example, sending system 110 may be configured (e.g., programmed) to identify and detect different types of sensitive information, such as credit card numbers, telephone numbers, names, passwords, account numbers, etc. For example, credit card numbers may have a format that is a string of numbers X to Y digits long, with our without separating characters (e.g., non-digits, hyphens, spaces, periods, commas, etc.) in between some digits. For example, for certain types of credit cards may include a string of 16 digits after stripping out any non-digits (e.g., separating characters), and other types of credit cards may require a string of 15 digits after stripping out any non-digits (e.g., separating characters).

In some implementations, sending system 110 may be programmed to identify and/or detect credit card numbers as numbers that conform to certain conditions or definitions. For example, some credit card providers may only have credit card numbers that start with a digit "3". Other credit card providers may only have credit card numbers that start with a digit "4", and still other credit card providers may only have credit card numbers that start with a digit "5". Credit card numbers or any numbers (e.g., account numbers) may be processed to determine if the numbers meet one or more conditions. For example sending system 110 may be programmed to perform the Luhn algorithm or a modulus 10 algorithm to check the checksum of the numbers to validate or confirm that the numbers are credit card numbers as a condition or additional condition to be sensitive information. Additional and/or different processing may be performed automatically (e.g., by sending system 110) to identify and/or detect sensitive information.

At block 150, sending system 110 receives a request to share the digital content or send a digital communication identified at 140. At block 155, sending system 110 determines whether the receiving system (e.g., receiving system 130) supports the same or similar features to protect sensitive information. For example, the determination may be based on a system identifier and/or software identifier of receiving system 130 (e.g., sending system 110 may request the identifier information from receiving system 130 or use the identifier information received previously).

If receiving system 130 does not support sensitive information protection, sending system 110 may still be implemented, as indicated in block 160, to allow the sharer or sender (e.g., Alice) to replace sensitive information as described in FIGS. 2A-D below; to allow automatic replacement of sensitive information as described above; or, to perform other operations with the sensitive information (not shown); or, not to replace the sensitive information. Operations described in block 145 may be implemented after block 160 or in conjunction with the operations of block 160. At block 175, the document is shared with Bob or email is sent to Bob, who is associated with receiving system 130.

If receiving system 130 supports sensitive information protection, determined at block 155, then at block 165, sending system 110 sends the sensitive information to vault 120. For example, the sensitive information may include a credit card number "4012-8888-8888-8888," which is sent to vault 120. The sensitive information is encoded as (e.g., represented by) a tag or reference that uniquely identifies the sensitive information. Vault 120 then sends one or more tags or references (e.g., reference tags) associated with sensitive information to sending system 110. For example, vault 120 may return a reference tag "Info ID=72384019" or "tag-id=3F5904E0-EF89-51D3-2A0C-4303E82C3301." A reference tag is not required to be human readable (but may be). A reference tag can be used to access, identify, or retrieve the associated sensitive information (e.g., converting the reference tag to sensitive information associated with it).

In some implementations, sending system 110 authenticates with vault 120 to send sensitive information and/or receive the associated reference tags. In other implementations, sending system 110 may receive the sender's (e.g., Alice's) credentials in an encrypted form and pass those encrypted credentials to vault 120 for authenticating Alice. Alice's credentials are encrypted to prevent sending system 110 or any administrators of sending system 110 from seeing, acquiring, or using Alice's credentials. Vault 120 is described further in FIG. 7.

At block 170, sending system 110 replaces the sensitive information with the reference tags provided by vault 120. For example, sending system 110 replaces the credit card number "4012-8888-8888-8888" with reference tag "Info ID=72384019" provided by vault 120.

In some implementations, sensitive information may be replaced with placeholder information (i.e., that serves as placeholder for the sensitive information). A placeholder or placeholder information may be defined by Alice or defined automatically by sending system 110 without any user intervention or assistance (e.g., defined or created by non-user). In some implementations, sending system 110 may provide a number of predefined placeholders for Alice to choose to replace a piece of sensitive information.

A placeholder may be a human readable substitute for sensitive information. "Human readable" means any one or more characters that are displayable, showable, or printable (i.e., not hidden characters, such as characters representing the outputs of the carriage return key, tab key, escape key, etc. on the keyboard). A placeholder does not need to uniquely identify any sensitive information. A placeholder cannot be converted to sensitive information (i.e., cannot be used to access, identify, or retrieve any sensitive information.

For example, sending system 110 replaces the credit card number "4012-8888-8888-8888" with a placeholder defined by Alice, defined by sending system 110, or selected by Alice from a list of available placeholders for a given type of information. Examples of placeholders include but are not limited to "CREDIT_CARD_NUMBER," "XXXX-XXXX-XXXX-XXXX," a blank string, a string of characters that includes invisible characters (e.g., characters not displayable and/or not printable), etc. At block 175, the document, email, or digital content, void of the sensitive information, is transmitted or sent to receiving system 130 along with the reference tag "TAG-ID=72384019."

Figure 2A:
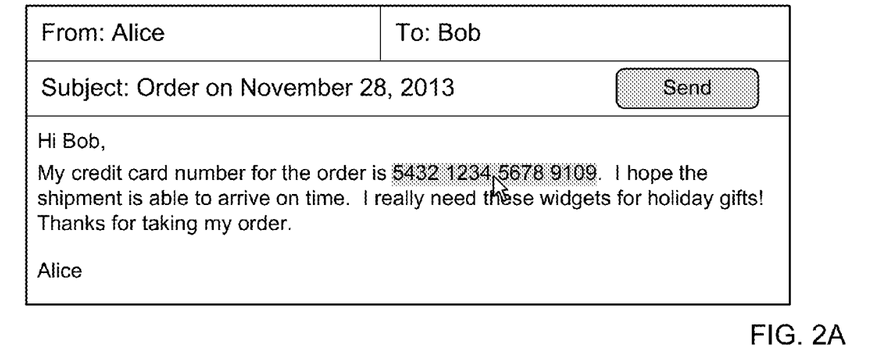
FIG. 2A shows an example user interface for preparing an example communication.

FIG. 2A shows an example user interface for preparing an example communication. For example, the communication is an email message prepared by Alice for sending to Bob. The email includes a credit card number "5432 1234 5678 9109" that Alice wants to protect as sensitive information. In some implementations, the credit card information is automatically identified and detected by sending system 110 (FIG. 1) and replaced with a reference tag provided by vault 120 or a placeholder.

In some implementations, the UI in FIG. 2A may allow Alice to identify the sensitive information and/or replace the identified sensitive information with other information (e.g., a reference tag or placeholder). For example, after Alice selects a piece of information (e.g., the credit card number) with a mouse pointer, as shown, Alice may be able to activate a menu or widget for defining how the identified information should be replaces. The menu or widget (shown in FIG. 2B) may be activated by, for example, right-clicking on the selected information or ctrl-clicking (i.e., clicking the mouse while pressing down a CTRL key or another key) on the selected information.

Figure 2B:
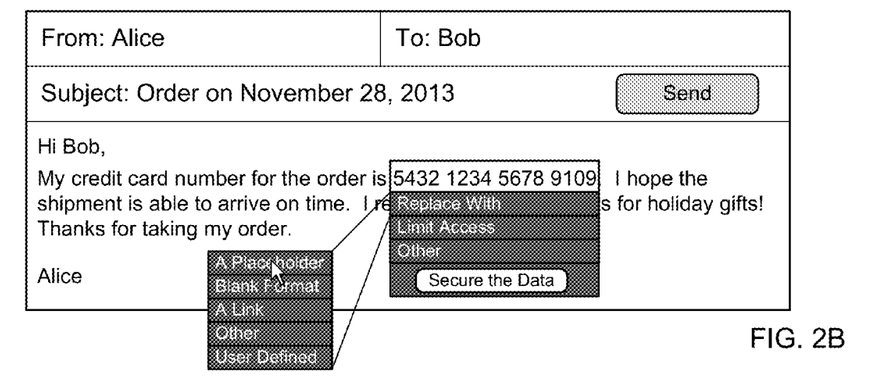
FIG. 2B shows the example user interface in a different state.

FIG. 2B shows the example user interface of FIG. 2A in a different state. In this state, the widget described in FIG. 2A is shown. The widget may be pop up in place, as shown, or pop up at another location. The widget shows, for example, the selected credit card number and one or more options nearby (e.g., below), such as "Replace With," "Limit Access," and "Other." In this example, these options are submenus. For example, when Alice selects the "Replace With" submenu, the submenu pops up and displays, for example, the choices of "A Placeholder," "Blank Format," "A Link," "Other," and "User Defined."

Alice may select the "A Placeholder" for replacing the credit card number with a system defined placeholder, "Blank format" for replacing the credit card number with a blank placeholder, "A Link" for replacing the credit card number with a link (e.g., Uniform Resource Locator (URL)), such as a link to vault 120 for accessing the credit card number, "Other" for replacing the credit card number with another placeholder based on implementation, and "User Defined" for replacing the credit card number with a placeholder entered or defined by Alice. In some implementations, a placeholder is delimited (e.g., marked at the beginning and end) with marks characters or symbols, which may be visible or hidden, to allow receiving system 130 to identify the placeholders and replace them with the original sensitive information. Receiving system 130 is described in FIG. 5 below.

Figure 2C:
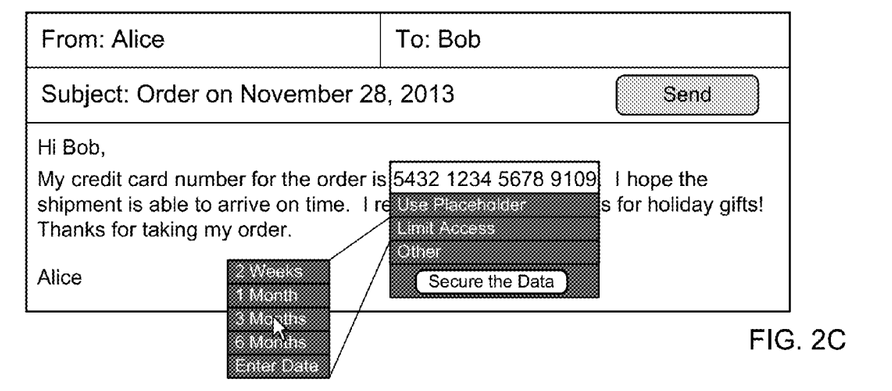
FIG. 2C shows the example user interface in another state.

FIG. 2C shows the example user interface of FIG. 2A in another state. After Alice has selected an option for a placeholder (e.g., selected the "A Placeholder" option), Alice may continue with other selection. In some implementations, Alice may be allowed to limit access to sensitive information based on time, access location, access device, etc. For example, the example implementation in FIG. 2C allows Alice to limit access to sensitive information (e.g., the credit card number) to a period of time. Alice may select, as shown in the example submenu, "2 Weeks," "1 Month," 3 Months," 6 Months," or "Enter Date," which allows Alice to enter one or more dates to define the time period.

Figure 2D:
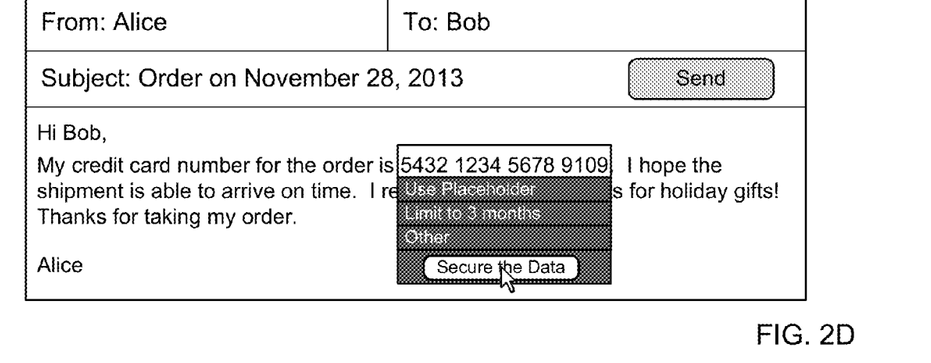
FIG. 2D shows the example user interface in yet another state.
Figure 3A:
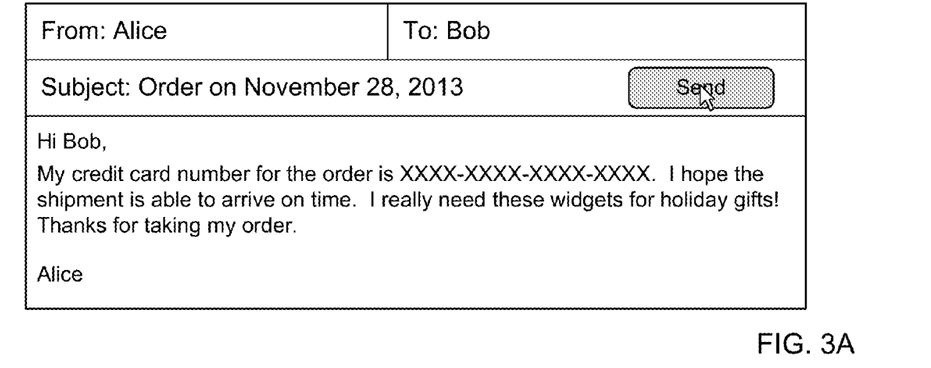
FIG. 3A shows an example communication prior to sending.

FIG. 2D shows the example user interface of FIG. 2A in yet another state. Alice has limited the access to the sensitive information to three months, for example. That is, Bob can see the credit card number within the next three months only. The limit is enforced by, for example, vault 120. When Alice is done navigating the menu and submenus, Alice may signal that she is done by, for example, simply clicking the "Secure the Data" button. The sensitive information (e.g., the credit card number "5432 1234 5678 9109") may then be replaced by a placeholder (e.g., "XXXX-XXXX-XXXX-XXXX"), as shown in FIGS. 3A and 4. In some implementations, the sensitive information may be replaced by one or more reference tags that represent the sensitive information (e.g., "3F5904E0-EF89-51D3-2A0C-4303E82C3301"), as shown in FIG. 3B.

FIG. 3A shows an example communication before sending. When Alice is ready to send this email or share a document or content with Bob, Alice can click on the "Send" button or a share or transmit button (not shown). If sending system 110 has not interacted with vault 120 to exchange the sensitive information with reference tags as described with block 165 (FIG. 1), sending system 110 may perform the exchange at this time. For example, sending system 110 has "deposited" the credit card number "5432 1234 5678 9109" with vault 120 and has received a reference tag "3F5904E0-EF89-51D3-2A0C-4303E82C3301" from vault 120 for the credit card number. Sending system 110 may save the sensitive information for the exchange when Alice replaces the sensitive information with the placeholder.

Figure 3B:
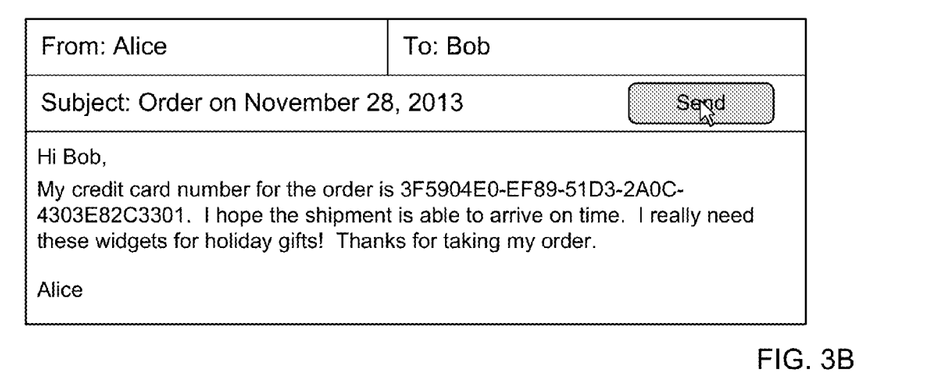
FIG. 3B shows another example communication prior to sending.
Figure 4:
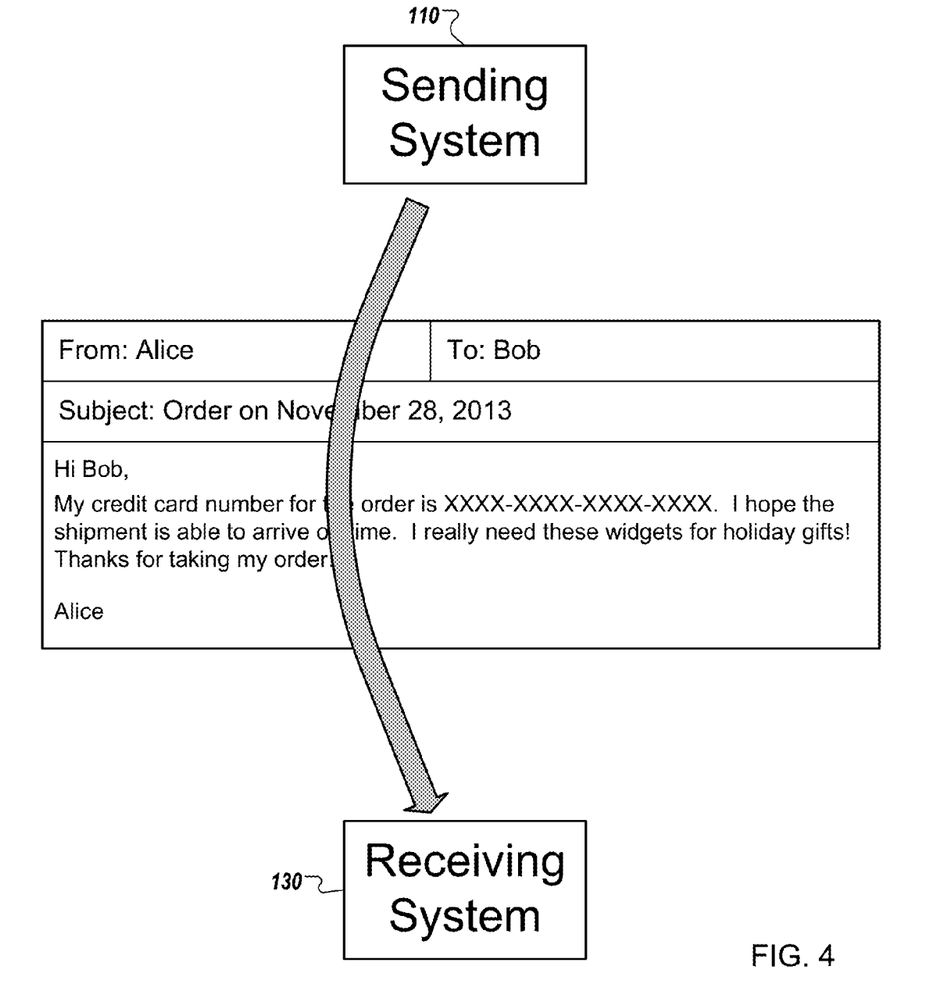
FIG. 4 shows an example transmission of an example communication.

FIG. 3B shows another example communication before sending. In some implementations, a reference tag (e.g., "3F5904E0-EF89-51D3-2A0C-4303E82C3301") may be used to replace the sensitive information (e.g., the credit card number).

If Alice has activated or defined any limits (e.g., access limit period), sending system 110 sends information regarding the limits to vault 120. An identifier for the recipient being authorized (e.g., Bob) can be sent with the time limit. If it just sends the time limit (e.g., a value that represents 3 months, without sending any identifier), the time limit would apply to everybody. In some implementation, sending system 110 may include the user who is affected by a limit in a human readable form, such as "the time limit for Jim James is 3 months". Vault 120 then parses "Jim James" as a user and applies the time limits to Jim James. Vault 120 uses the information to enforce the limits. For example, sending system 110 sends to vault 120 a time limit of "three months" in association with the sensitive information (e.g., the credit card number "5432 1234 5678 9109"). After sending system 110 has finished interacting with vault 120, sending system 110 is ready to send the email to receiving system 130.

FIG. 4 shows a transmission of an example communication. Sending system 110 sends the email prepared by Alice to Bob at the receiving system 130. The transmission does not include the sensitive information. One or more reference tags associated with sensitive information (e.g., reference tag "3F5904E0-EF89-51D3-2A0C-4303E82C3301") are also sent to vault 120, either with the email or at a different time. The reference tags may be hidden from the view of users (e.g., Alice and/or Bob). For example, in an email exchange, the reference tags may be included as metadata in the email header. If the content being exchanged is in HyperText Markup Language (HTML) format, the reference tags may be includes in using HTML "<meta> tags.

Figure 5:
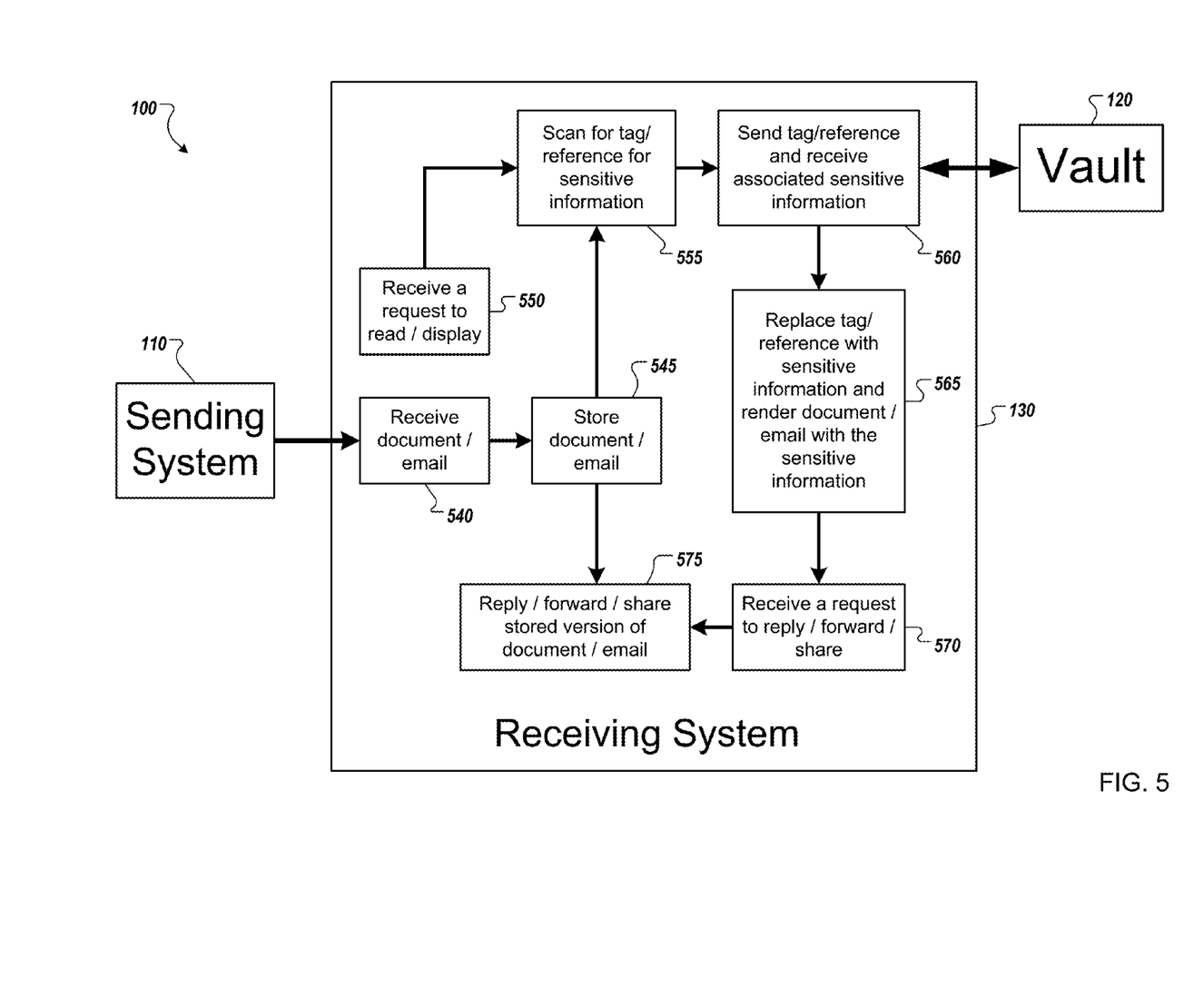
FIG. 5 shows another view of the example communication environment of FIG. 1.
Figure 6A:
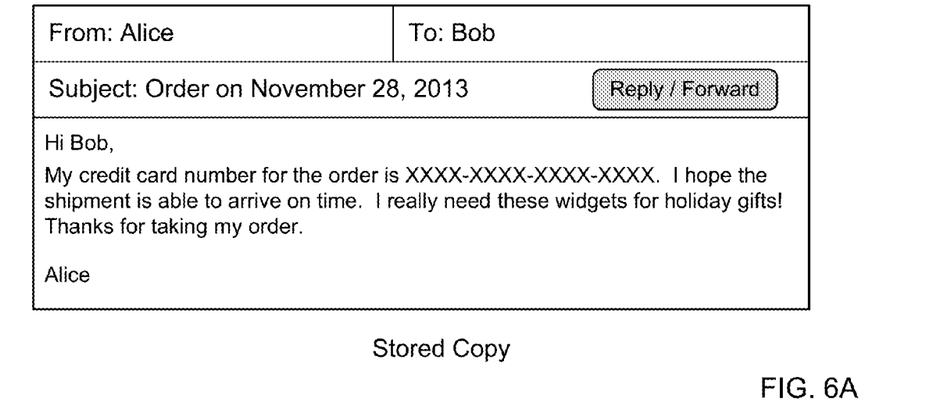
FIG. 6A shows an example stored copy of an example communication.

FIG. 5 shows another view of the example communication environment of FIG. 1. In some implementations, the functions, operations, or process 130 may include receiving digital content (e.g., Alice's email) from sending system 110 at block 540. At block 545, the email (e.g., along with any received reference tags, such as "3F5904E0-EF89-51D3-2A0C-4303E82C3301") may be stored or saved. FIG. 6A shows an example stored copy of an example communication (e.g., Alice's email). As shown, for example, the reference tag "3F5904E0-EF89-51D3-2A0C-4303E82C3301" may be stored in a manner (e.g., in an email header) that is not included in the email body. In some implementations, reference tags (e.g., "3F5904E0-EF89-51D3-2A0C-

4303E82C3301") may be stored with the email body (and stripped away when the email is forwarded).

Referring back to FIG. 5, when a request to read or display the email is received at block 550, the email is retrieved from the data store and, at block 555, reference tags are retrieved, detected or scanned to determine if receiving system 130 needs to retrieve any sensitive information from a vault (e.g., vault 120). In some implementations, the operations at block 555 include printing an email. In other implementations, printing emails are allowed at block 575, described below.

At block 560, the reference tags (e.g., along with any received reference tags, such as "3F5904E0-EF89-51D3-2A0C-4303E82C3301") are sent to vault 120. Vault 120 retrieves the sensitive information based on the reference tags and returns the sensitive information to receiving system 130. The correct vault 120 to interact with may be predetermined based on a communication. In some implementations, sending system 110 may indicate to receiving system 130, either with the transmission of Alice's email or separately, which vault 120 the sensitive information may be retrieved from. An implementation may specify the location (e.g., by URL, identifier, etc.) of the appropriate vault in, for example, the tag for the sensitive data, such as <tag-id='3F5904E0-EF89-51D3-2A0C-4303E82C3301' vault-id='7384'/>. Sending system 110 may also indicate how to access the sensitive information (e.g., the protocol to use to retrieve sensitive information).

In some implementations, accesses to sensitive information in a vault (e.g., vault 120) may be controlled by access control lists (ACL). An ACL may be derived from the communication, i.e., the email from Alice to Bob. For example, the ACL may be created using the email's information on the "From," "To," "CC," and "BCC" lines. If a communication is a document, a social network post, and the like, the ACL may be created using information of the sharer and the people or users the document is shared with. If a communication is a conference or any interactive communications (e.g., a voice conference or a video conference), the ACL may be created using information of the originator and participants. The sender of an email, sharer of a post, originator of a conference, etc. may also explicitly indicate, using a user interface (not shown), who or which users may have access, and what types of access, to certain communications. When receiving system 130 (e.g., a mail server, document server, conference server, etc.) requests the sensitive information, receiving system 130 provides the information of the sender and receivers of a communication or participants of a post, conference, etc. to vault 120. The information is used to determine whether access to sensitive information is granted.

If any access limits are implemented and/or requested, the limits are also checked by receiving system 130 and/or vault 120. For example, Alice places a time limit of three months for Bob to access the credit card number in an email. Bob's access is verified at the time of extraction of the credit card number, and if verification passes the credit card number is received from 120. If another recipient Charlie who is not authorized to view the credit card number has access to the correspondence (e.g., the email was forwarded to Charlie), vault 120 will not provide the sensitive data based on the ACL (i.e., the ACL does not indicate that Charlie can access the credit card number). In some implementations, if Charlie is not authorized, the vault may return a placeholder or other representation. The tag may be replaced with a placeholder or other representation by the receiving system upon receiving a "not authorized" status, code, or message from the vault.

Figure 6B:
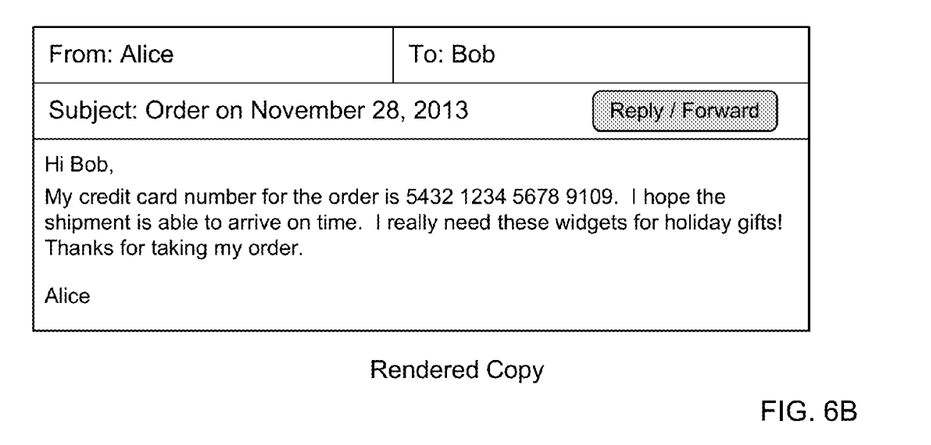
FIG. 6B shows an example rendered copy of an example communication.

At block 565, receiving system 130 replaces the placeholder for the sensitive information (e.g., credit card number) for Bob. For example, receiving system 130 may scan for marks that indicate sensitive information has been replaced at sending system 110, such as scanning for a delimiter that marks the beginning and end of each piece of sensitive information. When the communication or digital content (e.g., Alice's email) is rendered for display or printing, receiving system 130 replaces "XXXX-XXXX-XXXX-XXXX" with "5432 1234 5678 9109" in Alice's email to Bob. FIG. 6B shows an example rendered copy of an example communication (e.g., Alice's email).

Referring back to FIG. 5, if an unauthorized user (e.g., Charlie) attempts to view the email, vault 120, based on a reference tag (e.g., "3F5904E0-EF89-51D3-2A0C-4303E82C3301") and/or the accessing user (e.g., Charlie), will not return any sensitive information, and receiving system 130 does not replace the reference tag with the sensitive information (e.g., does not show the sensitive information in place of the placeholder "XXXX-XXXX-XXXX-XXXX"). The receiving system 130 may, depending on implementations, replace the reference tag with a placeholder, or some other indication to show that viewing or accessing the sensitive information is not authorized. In some implementations, receiving system 130 may replace the placeholder "XXXX-XXXX-XXXX-XXXX" with a warning message, such as "Unauthorized to view" when Charlie attempts to accesses the email, and may not permit access to the email.

The decoding of a reference tag to sensitive information is transparent to the recipient (e.g., Bob). No intervention is needed from Bob to initiate processing the received email to view the sensitive information. In some implementations, Bob may be given the choice (e.g., using a setting) to replace the placeholder or a reference tag automatically or replace only when Bob clicks on a widget. For example, Bob may be viewing Alice's email using a device (e.g., computer) in a public library.

In some implementations, receiving system 130 may lock the sensitive information to prevent copying or capturing from a display. For example, sensitive information can be rendered as images or interactive UI elements instead of text to prevent intentional or accidental copying. Receiving system 130 may also be implemented that the sensitive information is not replaced or rendered for printing (e.g., only print the placeholder or another message, such as "Redacted").

At block 570, receiving system 130 receives a request to reply or forward an Alice's email, or a request to share Alice's communication if Alice's communication is not an email. The request may be initiated by Alice. At block 575, the stored version or copy (see FIG. 6A) is forwarded, included in a reply or response, or shared with a third recipient. If the receiving system of the third recipient implements sensitive data protection and the third recipient is authorized to access the sensitive information, the receiving system will decode the sensitive information as describe above by receiving system 130.

If the receiving system of the third recipient does not implement sensitive data protection, reference tags used in a communication may be replaced with placeholders (e.g. XXXX-XXXX-XXXX-XXXX for a credit card). However, the reference tags may be preserved in case the communication is forwarded to other users who are authorized to view or access the sensitive information.

Figure 7:
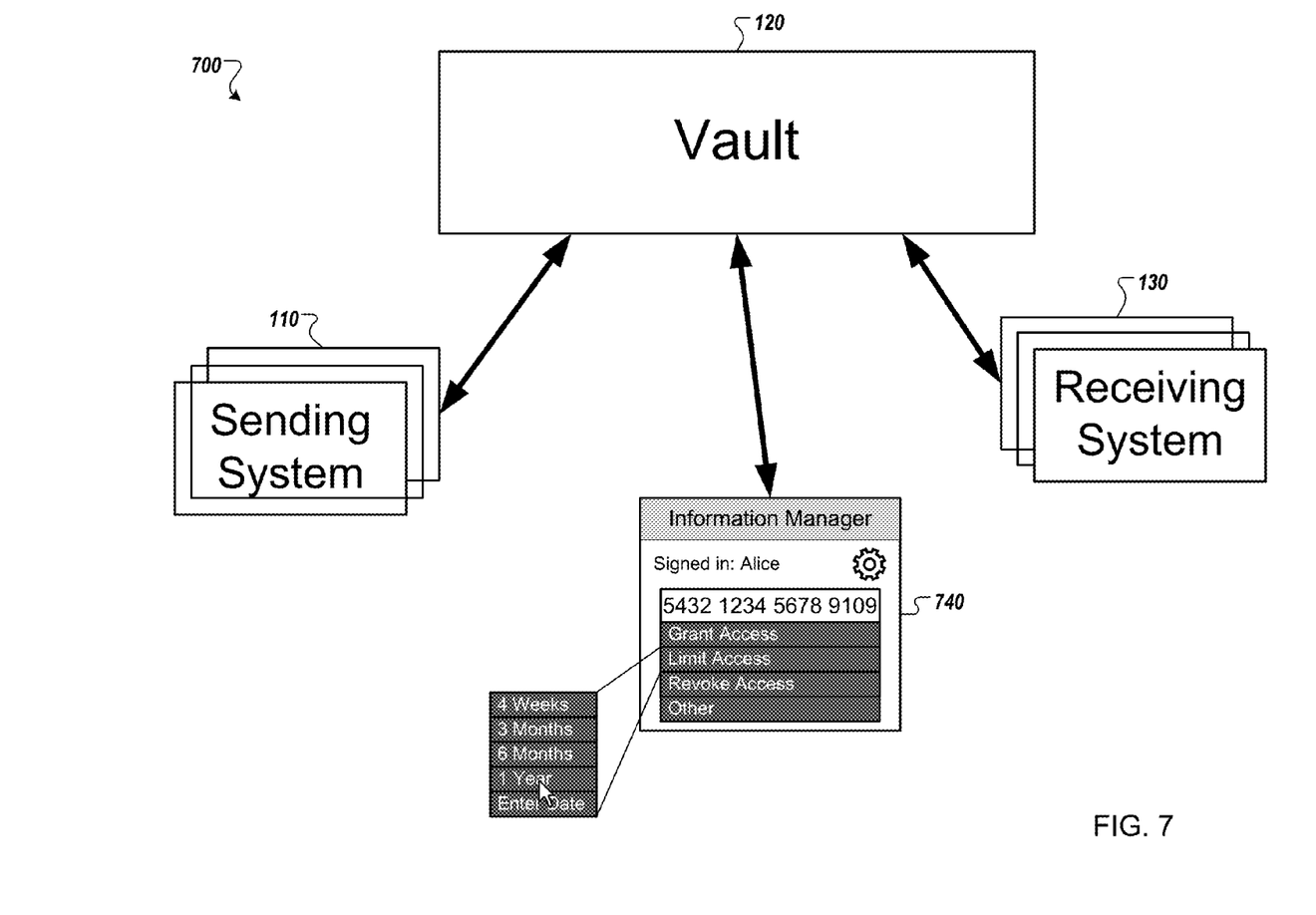
FIG. 7 shows another example communication environment according to some example implementations.

FIG. 7 shows another example communication environment according to some example implementations. There may be one or more vaults 120 depending on implementations. A vault 120 may be a device or a system supported by multiple devices that may include a database. A vault 120 may serve one or more sending systems and one or more receiving systems. A vault 120 allows a sending system 110 to "deposit" sensitive information or data. Pieces of sensitive information are identified or associated with unique identifiers (e.g., reference tags). Unique identifiers are assigned to the sensitive information by the vault 120 or sending system 110. If unique identifiers are assigned by vault 120, the identifiers (e.g., reference tags) are returned to sending system 110.

A sending system 110 sends the unique identifiers to a receiving system 130 along with a communication with sensitive information of the communication stripped out. The transmission or the communication may be sent encrypted or not encrypted. Receiving system 130 then extracts the unique identifiers and sends to the vault 120 where the associated sensitive information is "deposited" by sending system 110. The vault 120 then provides the sensitive information correspond to the unique identifiers to receiving system 130.

Unique identifiers may be locally unique across a sending system, a receiving system, or a vault, or universally unique across sending systems, receiving systems and vaults that support sensitive data protection. For example, a vault 120 may be implemented to assign Globally Unique Identifiers (GUIDs) or Universally Unique Identifiers (UUIDs) or the like.

In some implementations, a vault 120 may allow users to manage their sensitive information using a user interface (UI) 740. A user may be identified or authenticated in any trustworthy manner. For example, Alice may register with vault 120. Vault 120 provides sign in credentials to Alice, which can be used by Alice to sign in to vault 120. After signing in, vault 120 may provide UI 740 for Alice to manage her sensitive information deposited with vault 120. Alice's sensitive information refers to any sensitive information deposited to vault 120 by any sending system 110 with Alice being the originator, initiator, sharer, or sender (e.g., Alice is the original sender of an email). In some implementations, Alice may provide the sensitive information (e.g., "5432 1234 5678 9109") the corresponding reference tag (e.g., "3F5904E0-EF89-51D3-2A0C-4303E82C3301"), or both to access or manage the sensitive information.

In some implementations, the original sender, sharer, initiator, or originator (e.g., Alice) can delegate authority to another user to modify or manage sharing settings for accessing sensitive data. For example, Alice can allow her assistant or a trusted recipient to manage who can see certain sensitive data (e.g., the credit card number). The UI 740 or another UI (not shown) may include a "Delegate Access Manager" option for Alice to specify that, for example, user Bob can "Grant," "Revoke," or "Manage" access to "All sensitive data," of "Selected sensitive data," etc. For example, Alice can delegate to Bob as an access manager, who can "Grant" access to "Selected sensitive data." Alice can identify the selected sensitive data by identifying the data (e.g., "5432 1234 5678 9109") or the reference tags associated with the data (e.g., "3F5904E0-EF89-51D3-2A0C-4303E82C3301")

Using UI 740 or another interface, Alice can manually configure potential recipients or users that may access (e.g., view) the decoded sensitive data (e.g., "5432 1234 5678 9109") using, for example, the "Grant Access" option of the UI. In some implementations, Alice can specify the expiration time of the authorization for the recipient to view sensitive data using, for example, the "Limit Access" option of the UI. Alice can specify a time period as described above. The "Revoke Access" option allows Alice to revoke access (i.e., no longer allowed to see the decoded sensitive data.

For example, Alice's email to Bob is forwarded to Charlie, who is not an original recipient of that email. Vault 120 may be implemented to automatically grant access (e.g., using ACL) to original recipients of an email. Charlie or Bob can request Alice to grant Charlie access to see the sensitive data. Once Alice grants Charlie access using, for example, UI 740, Charlie's receiving system 130 will be able to retrieve the sensitive information and render Charlie's email with the sensitive information in an accessible form. However, another user cannot retrieve the sensitive information unless Alice grants access.

Alice can revoke access to sensitive data using UI 740. For example, after granting access to Charlie, Alice realizes that Bob does not need access to the credit card number (i.e., the sensitive data Bob was granted access based on the original email sent to Bob). Alice can select the "Revoke Access" option of UI 740 and identify whose access is revoked and/or what sensitive data the access to which is revoked.

Alice can revoke access at any time, such as immediately after sending the example email to Bob (e.g., Alice changes her mind, sends the email unintentionally, realizes that she did not really want to share that information, etc.). Alice may use UI 740 or another UI (not shown) to modify, for example, the access control list to revoke Bob's access to the sensitive information. As soon as Bob's access is revoked, Bob loses the ability to access (e.g., see) the sensitive information.

In some implementations, when Alice revokes access to sensitive information, vault 120 may notify Alice (e.g., by email, text messages, or another manner specified by Alice using configuration settings) whether Bob had already accessed the sensitive information before his access was revoked.

Figure 8:
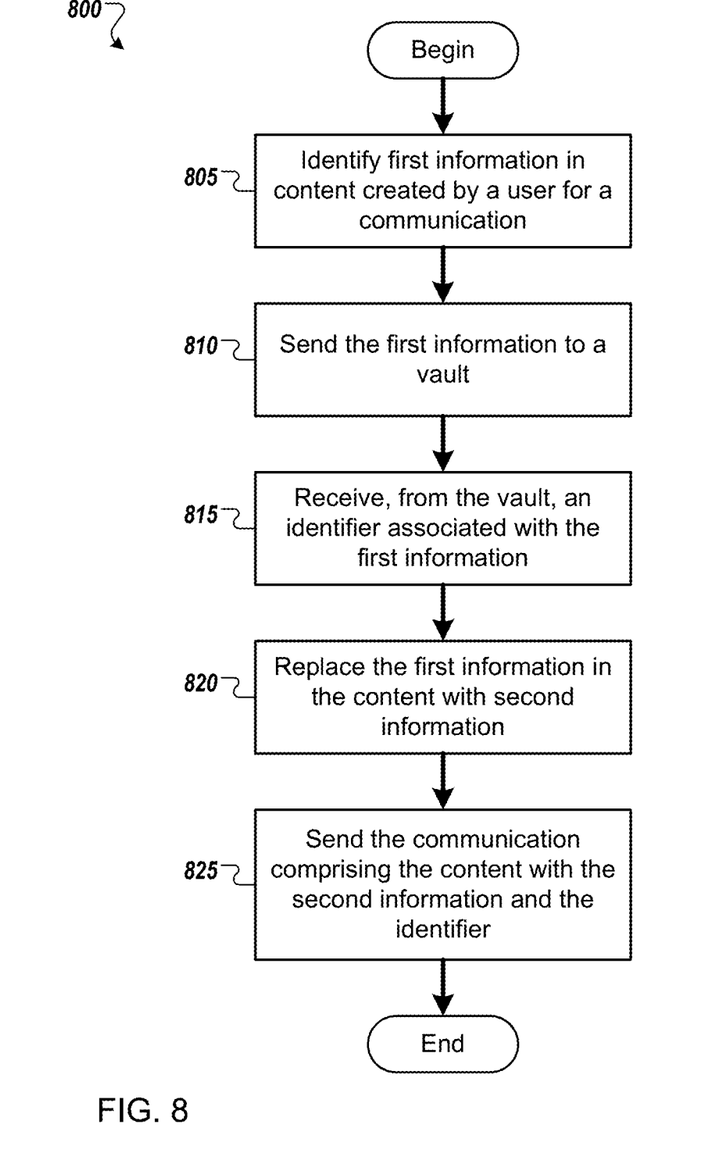
FIG. 8 shows an example of a process implementation.

FIG. 8 shows an example of a process implementation. Process 800 includes, at block 805, sending system 110 identifies or detect sensitive information among the content (e.g., of an email) created by a user (e.g., Alice) for a communication, sharing, or otherwise transmitting to another system over a network. At block 810, sending system 110 sends or deposits the sensitive information to a vault 120. At 815, vault 120 returns and sending system 110 receives an identifier or reference tag associated with the sensitive information;

At 820, sending system 110 replaces the sensitive information in the email with some information that is not sensitive or cannot be used to access the sensitive information. For example, the sensitive information may be stripped out and replaced with a placeholder or information that serves as a placeholder. In some implementations, the sensitive information is simply stripped out or deleted without inserting any replacement information. At block 825, sending system 110 sends or transmits the communication (e.g., the content) to receiving system 130. The transmission includes the placeholder and the identifier but not the sensitive information. The receiving system 130 then process the communication as described in FIG. 5.

In some examples, process 800 may be implemented with different, fewer, or more blocks. Process 800 may be implemented as computer executable instructions, which can be stored on a medium, loaded onto one or more processors of one or more computing devices, and executed as a computer-implemented method.

Figure 9:
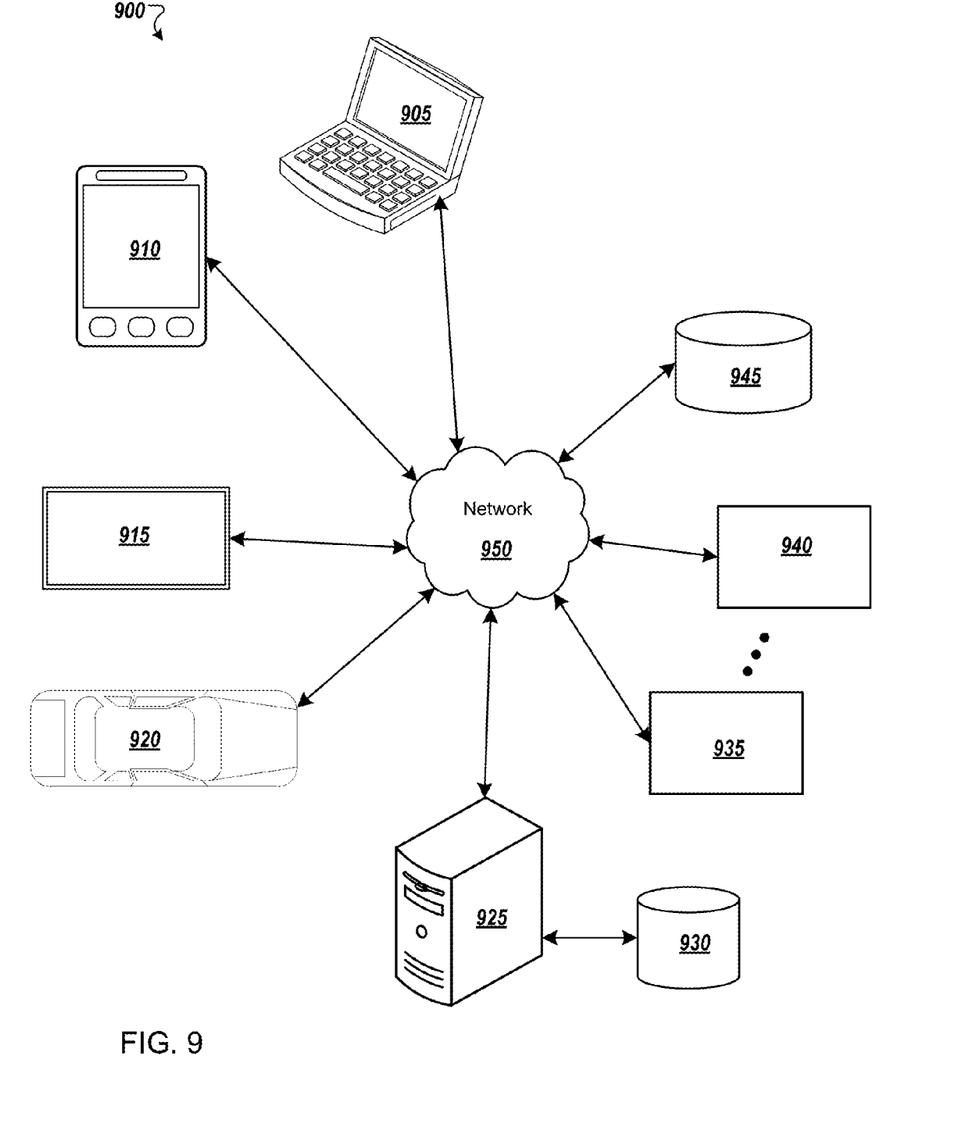
FIG. 9 shows an example environment suitable for some example implementations.

FIG. 9 shows an example environment suitable for some example implementations. Environment 900 includes devices 905-945, and each is communicatively connected to at least one other device via, for example, network 960 (e.g., by wired and/or wireless connections). Some devices may be communicatively connected to one or more storage devices 930 and 945.

An example of one or more devices 905-945 may be computing device 1005 described below in FIG. 10. Devices 905-945 may include, but are not limited to, a computer 905

(e.g., a laptop computing device), a mobile device 910 (e.g., smartphone or tablet), a television 915, a device associated with a vehicle 920, a server computer 925, computing devices 935-940, storage devices 930 and 945.

In some implementations, devices 905-920 may be considered user devices (e.g., devices used by users to access services and/or issue requests, such as on a social network). Devices 925-945 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, and/or share content or access emails using user device 905 or 910. Bob and Charlie may access their emails (e.g., view Alice's email) using devices 915-920. Sending system 110, vault 120, and receiving system 130 may be supported by devices 925-945 and/or other devices (not shown).

Figure 10:
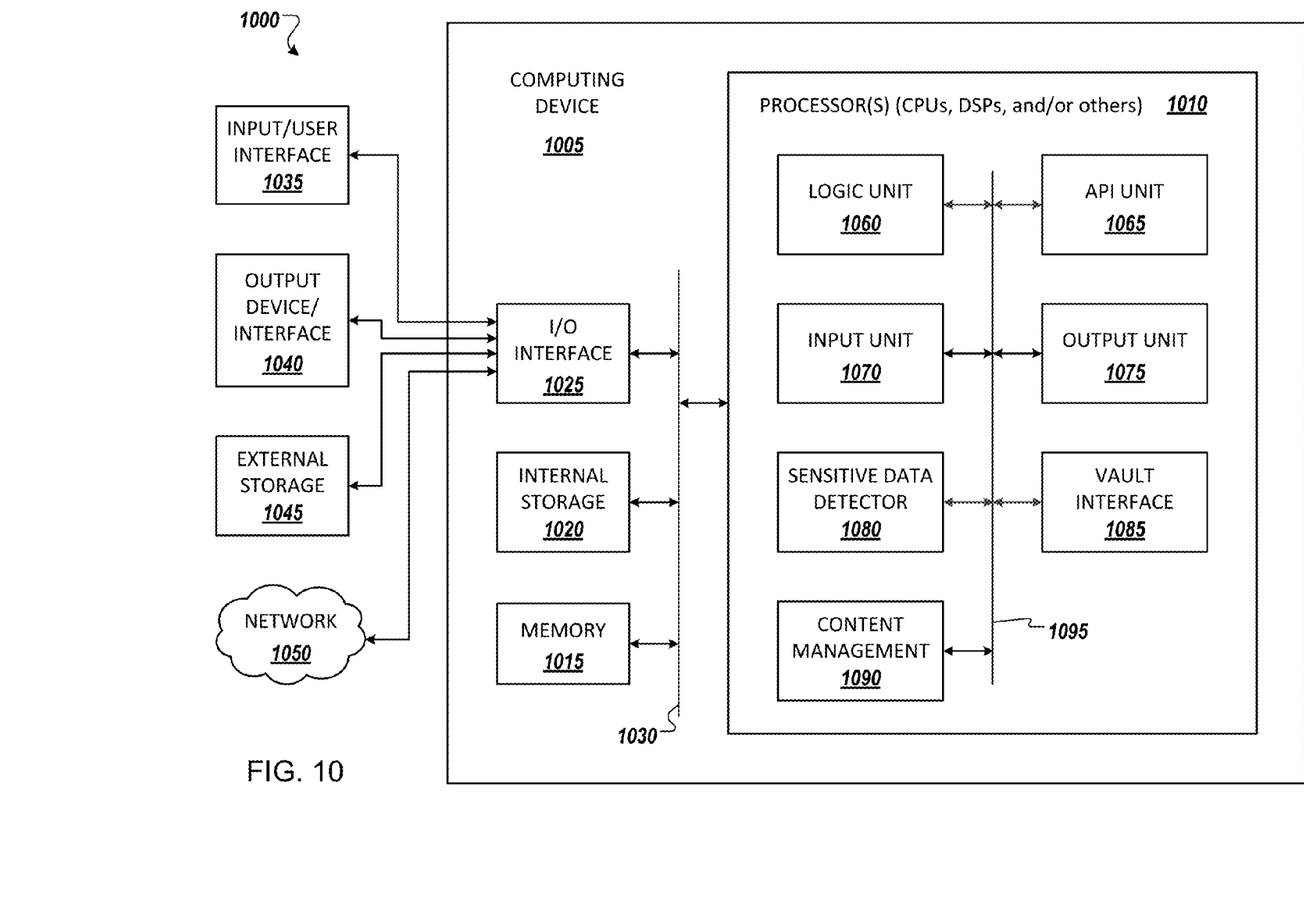
FIG. 10 shows an example computing environment with an example computing device suitable for use in some example implementations.

FIG. 10 shows an example computing environment with an example computing device suitable for use in some example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, sensitive data detector 1080, vault interface 1085, content management 1090, and inter-unit communication mechanism 1095 for the different units to communicate with each other, with the OS, and with other applications (not shown). For example, sensitive data detector 1080, vault interface 1085, and content management 1090 may implement one or more processes shown and described in FIGS. 1 to 9. The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075, sensitive data detector 1080, vault interface 1085, and content management 1090). For example, after input unit 1070 has detected a user input to send an email, API unit 1065 may call on sensitive data detector 1080 to detect or identify any sensitive information. Once identified, vault interface 1085 is called to interact with a vault 120 to deposit the sensitive information and retrieve one or more identifiers. Content management 1090 is then called by API unit 1065 to replace the sensitive information with non-sensitive information (e.g., placeholders). Output unit 1075 is then called to output the communication to receiving system 130 via i/o interface 1025.

In some instances, logic unit 1060 may be configured to control the information flow among the units and direct the services provided by API unit 1065, input unit 1070, output unit 1075, sensitive data detector 1080, vault interface 1085, and content management 1090 in some example implementations described above. For example, the flow of one or more processes or implementations may be controlled by logic unit 1060 alone or in conjunction with API unit 1065.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
    identifying first information in content created by a user for a communication;
    sending the first information to a vault;
    receiving, from the vault, an identifier associated with the first information;
    replacing the first information in the content with second information that is associated with the first information and does not provide any indication of the content of the first information;
    providing the user with a user control to select a manner of the replacing from designating at least one of a placeholder, a blank format, a link, and a user-defined replacement format, and to prevent the sending of the second information for the recipient that does not support the capability to process the communication comprising the content with the second information and the identifier; and
    sending the communication comprising the content with the second information and the identifier, wherein the sending the communication is limited to a user-defined expiration period after which the first information cannot be retrieved from the vault.

2. The method of claim 1, wherein the identifying the first information comprises receiving input from the user identifying the first information.

3. The method of claim 1, further comprising sending third information about the communication to the vault, the first information being associated with the communication.

4. The method of claim 1, wherein the first information is defined by the user.

5. The method of claim 1, wherein the second information is defined by the user or by a non-user that performs the replacing the first information.

6. The method of claim 1, further comprising:
    receiving another communication associated with an access limit based on at least one of a time duration, an access location of a recipient, and an access device of a recipient, the another communication comprising another content, another second information, and another identifier;
    sending the another identifier to the vault;
    receiving, from the vault, another first information associated with the another identifier; and
    rendering the another content in the another communication with the another second information replaced with the another first information.

7. The method of claim 6, wherein the another first information is associated with an expiration period, after which the another identifier cannot be used to retrieve the another first information from the vault.

8. The method of claim 1, wherein the processor is further configured to perform:
    sending third information about the communication to the vault, the first information being associated with the communication.

9. A non-transitory computer readable medium having stored therein computer executable instructions for:
    identifying first information in content created by a user for a communication;
    sending the first information to a vault;
    receiving, from the vault, an identifier associated with the first information;
    replacing the first information in the content with second information that is associated with the first information and does not provide any indication of the content of the first information;
    receiving another communication associated with an access limit based on at least one of a time duration, an access location of a recipient, and an access device of a recipient, the another communication comprising another content, another second information, and another identifier;
    sending the another identifier to the vault;
    receiving, from the vault, another first information associated with the another identifier; and
    rendering the another content in the another communication with the another second information replaced with the another first information; and
    sending the communication comprising the content with the second information and the identifier.

10. The computer readable medium of claim 9, wherein the identifying the first information comprises receiving input from the user identifying the first information.

11. The computer readable medium of claim 9, further comprising computer executable instructions for:
    sending third information about the communication to the vault, the first information being associated with the communication.

12. The computer readable medium of claim 9, wherein the first information is defined by the user.

13. The computer readable medium of claim 9, wherein the second information is defined by the user or by a non-user that performs the replacing the first information.

14. The non-transitory computer readable medium of claim 9, further comprising providing the user with a user control to select a manner of the replacing from designating at least one of a placeholder, a blank format, a link, and a user-defined replacement format, and to prevent the sending of the second information for the recipient that does not support the capability to process the communication comprising the content with the second information and the identifier, wherein the sending the communication is limited to a user-defined expiration period after which the first information cannot be retrieved from the vault.

15. At least one computing device comprising storage and a processor configured to perform:
- at a computer processor, identifying first information in content created by a user for a communication;
- sending, by the computer processor, the first information to a vault;
- receiving, from the vault, an identifier associated with the first information;
- replacing the first information in the content with second information that is associated with the first information and does not provide any indication of the content of the first information;
- providing the user with a user control to select a manner of the replacing from designating at least one of a placeholder, a blank format, a link, and a user-defined replacement format, and to prevent the sending of the second information for the recipient that does not support the capability to process the communication comprising the content with the second information and the identifier; and
- the computer processor sending the communication comprising the content with the second information and the identifier, wherein the sending the communication is limited to a user-defined expiration period after which the first information cannot be retrieved from the vault.

16. The at least one computing device of claim 15, wherein the identifying the first information comprises receiving input from the user identifying the first information.

17. The at least one computing device of claim 15, wherein the first information is defined by the user of the at least one computing device.

18. The at least one computing device of claim 15, wherein the second information is defined by the user or by a non-user of the at least one computing device that performs the replacing the first information.

19. The at least one computing device of claim 15, wherein the processor is further configured to perform:
- receiving, by the computer processor, another communication comprising another content, another second information, and another identifier;
- the computer processor sending the another identifier to the vault;
- receiving, from the vault, another first information associated with the another identifier; and
- the computer processor rendering the another content in the another communication with the another second information replaced with the another first information.

20. The at least one computing device of claim 19, wherein the another first information is associated with an expiration period, after which the another identifier cannot be used to retrieve the another first information from the vault.

* * * * *